(12) United States Patent
Ladouceur

(10) Patent No.: US 8,373,651 B2
(45) Date of Patent: Feb. 12, 2013

(54) SYSTEMS AND METHODS FOR INPUTTING DATA USING MULTI-CHARACTER KEYS

(75) Inventor: Norman M. Ladouceur, Waterloo (CA)

(73) Assignee: Research In Motion Limited, Waterloo (CA)

( * ) Notice: Subject to any disclaimer, the term of this patent is extended or adjusted under 35 U.S.C. 154(b) by 900 days.

(21) Appl. No.: 11/182,223

(22) Filed: Jul. 15, 2005

(65) Prior Publication Data

US 2007/0013650 A1    Jan. 18, 2007

(51) Int. Cl.
  *G09G 5/00* (2006.01)
(52) U.S. Cl. ......... 345/156; 345/157; 345/168; 345/169
(58) Field of Classification Search .......... 345/156–184; 455/556.1, 550, 566
  See application file for complete search history.

(56) References Cited

U.S. PATENT DOCUMENTS

| | | | |
|---|---|---|---|
| 5,564,560 A * | 10/1996 | Minelli et al. | 200/516 |
| 5,714,983 A * | 2/1998 | Sacks | 345/168 |
| 5,917,613 A * | 6/1999 | Miller | 358/442 |
| 5,991,396 A * | 11/1999 | Salm et al. | 379/355.09 |
| 6,097,964 A * | 8/2000 | Nuovo et al. | 455/566 |
| 6,204,848 B1 * | 3/2001 | Nowlan et al. | 715/810 |
| 6,286,064 B1 * | 9/2001 | King et al. | 710/67 |
| 6,346,894 B1 * | 2/2002 | Connolly et al. | 341/22 |
| 6,686,902 B2 * | 2/2004 | Lee | 345/157 |
| 7,102,620 B2 * | 9/2006 | Harries et al. | 345/169 |
| 2002/0139653 A1 * | 10/2002 | Blossfeld et al. | 200/512 |
| 2003/0136650 A1 | 7/2003 | Lai | |
| 2004/0074755 A1 * | 4/2004 | Komatsu et al. | 200/513 |
| 2005/0116927 A1 * | 6/2005 | Voelckers | 345/157 |
| 2005/0225537 A1 * | 10/2005 | Kim | 345/168 |

FOREIGN PATENT DOCUMENTS

| | | |
|---|---|---|
| DE | 3919099 A | 12/1990 |
| EP | 1111879 A1 | 6/2001 |
| GB | 2402650 A | 12/2004 |

OTHER PUBLICATIONS

Brief Communication mailed on Jun. 30, 2010. In European patent application No. 05015466.5.
Decision to refuse a European Patent application mailed Aug. 23, 2010. In European patent application No. 05015466.5.
Communication pursuant to Article 96(2)EPC mailed on Oct. 8, 2007. In European patent application No. 05015466.5.
Summons to attend oral proceedings pursuant to Rule 115(1) EPC mailed Mar. 31, 2010. In European patent application No. 05015466.5.

* cited by examiner

*Primary Examiner* — Amare Mengistu
*Assistant Examiner* — Jennifer Zubajlo
(74) *Attorney, Agent, or Firm* — Novak Druce + Quigg LLP

(57) ABSTRACT

Systems and methods are provided for inputting data to a mobile device using multi-character keys. A first input may be generated by pressing a multi-character key on the mobile device. In response to the first input, the mobile device may sequentially display a plurality of characters associated with the pressed multi-character key. When a desired character is displayed, a second input may be generated to select the currently displayed character as character data input.

18 Claims, 12 Drawing Sheets

SYSTEMS AND METHODS FOR INPUTTING DATA USING MULTI-CHARACTER KEYS

FIELD

The technology described in this patent document relates generally to the field of input systems for electronic devices. More particularly, the patent document describes systems and methods for inputting data using multi-character keys.

BACKGROUND

Mobile devices having keyboards with multi-character keys are known in this field. For example, a standard keypad on a cellular telephone typically includes multi-character keys that can be used to input number or letter characters. Multi-character keyboards are also known for other devices, such as personal digital assistants, two-way paging devices, and the like.

DETAILED DESCRIPTION

Figure 1:
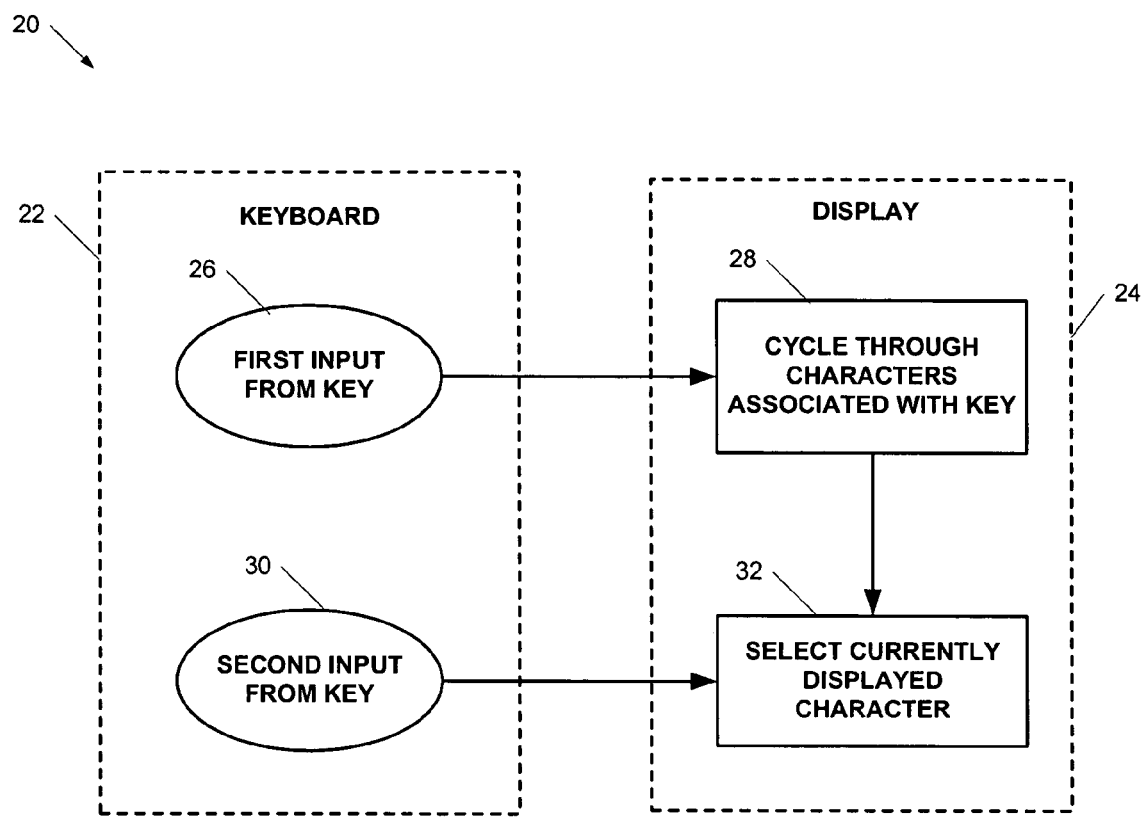
FIG. 1 depicts an example of a system for inputting data to a mobile device that includes a keyboard having a plurality of multi-character keys.

FIG. 1 is a block diagram depicting an example system 20 for inputting data to a mobile device that includes a keyboard 22 having a plurality of multi-character keys. The mobile device includes a keyboard 22, with a plurality of multi-character keys, and a display 24. Examples of a keyboard having a plurality of multi-character keys may include a telephone-style keyboard (see, e.g., FIG. 7), a reduced QWERTY-style keyboard (see, e.g., FIG. 4), or other keyboards in which more than one character may be input using the same key.

Each multi-character key in the keyboard 22 has a plurality of associated characters. Characters associated with a multi-character key may be printed on or alongside the key, or otherwise displayed to a user. For example, with reference to FIG. 4, the multi-character key in the upper-left corner of the illustrated keyboard includes at least three associated characters: "Q," "W" and "!". In addition, a multi-character key may also include one or more associated characters that are not printed on the keyboard or otherwise displayed to a user. For example, the multi-character key in the upper-left corner of the keyboard in FIG. 4 may also be associated with the lower-case characters "q" and "w," which are not printed on the key.

In order to select a desired character associated with a multi-character key, a user presses the multi-character key to generate a first input 26 which causes the system 20 to sequentially display 28 the characters associated with the key. For example, with reference to FIG. 4, if the multi-character key in the upper-left corner of the keyboard is pressed, then the system 30 may cause the display 24 to sequentially display the associated characters "Q," "W," "q," "w," and "!". The desired character is then selected with a second input from the keyboard 40, which causes the system 20 to select the currently displayed character 32 as the character input to the mobile device. For example, if a user desires to enter the lower-case letter "w" using the key illustrated in FIG. 4, then the user may press the associated multi-character key to begin cycling through the associated characters on the display 24, and enter the second input 30 when the lower-case "w" is displayed.

Figure 2:
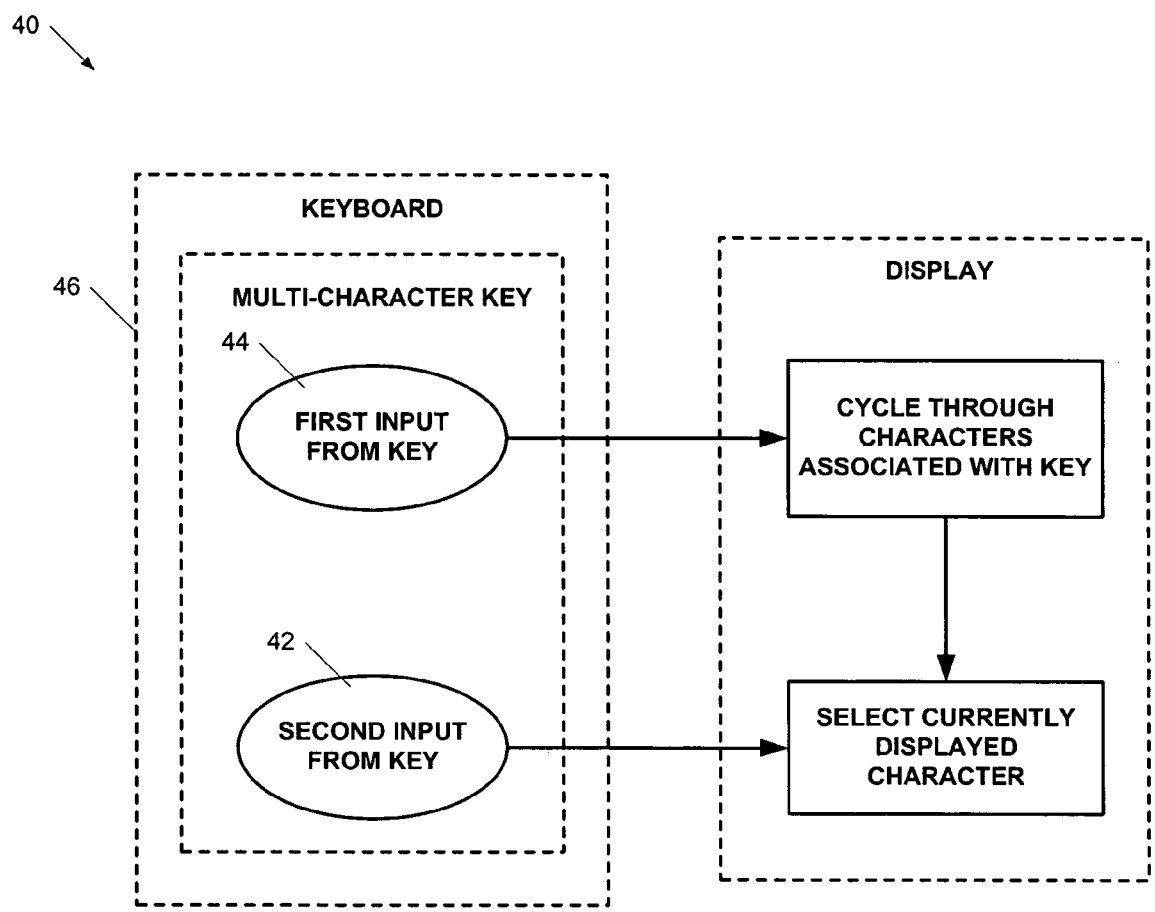
FIG. 2 depicts another example of a system for inputting data to a mobile device using multi-character keys.

As illustrated in FIG. 2, the second input 42 may be generated in one example using the same multi-character key that is pressed to generate the first input 44. For instance, the first input 44 may be generated by pressing the multi-character key a first time, and the second input 42 may be generated by pressing the multi-character key a second time. In another example, the multi-character keys on the keyboard 46 may each include two switches, with a first switch generating the first input 44 and the second switch generating the second input 42. For instance, a first switch may be activated by partially depressing the multi-character key and the second switch may be activated by completely depressing the multi-character key (see, e.g., FIGS. 5 and 6). In yet another example, the first input 44 may be generated by pressing and holding the multi-character key, and the second input 42 may be generated by releasing the multi-character key.

Figure 3:
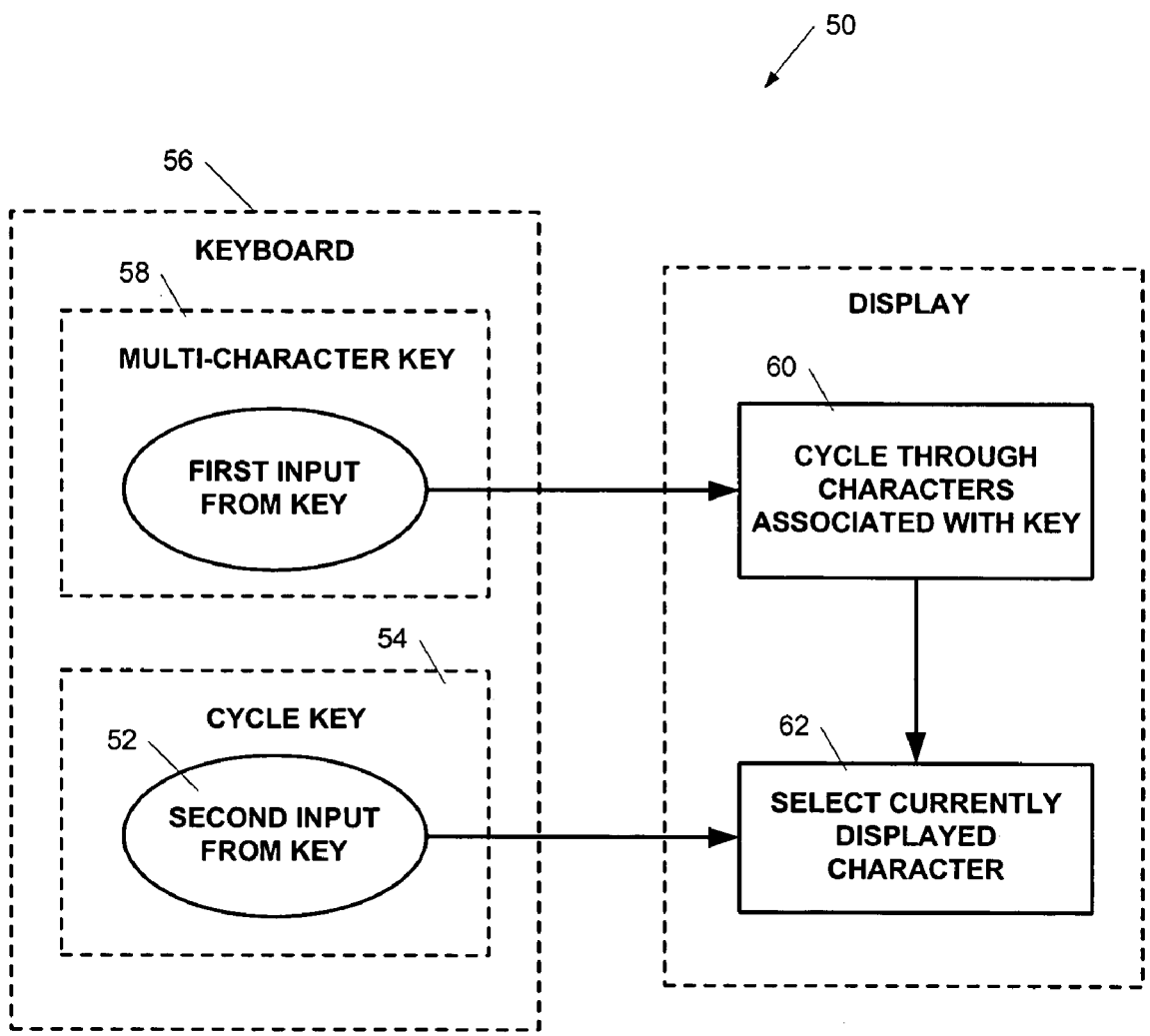
FIG. 3 depicts an example of a system for inputting data to a mobile device using multi-character keys and a specialized key.

FIG. 3 illustrates another example system 50 in which the second input 52 is generated using a specialized key 54 on the keyboard 56. In this example, pressing the multi-character key 58 causes the system 56 to begin sequentially displaying 60 the characters associated with the key. The desired character is then selected 62 by pressing the specialized key 54 while the desired character is displayed. The specialized key may, for example, be a cycle key that is included on the mobile device keyboard 56 in addition to the character entry and functional keys (see, e.g., FIG. 8).

The system functions of sequentially displaying characters associated with a multi-character key and selecting a currently displayed key as the data input, as depicted in FIGS. 1-3, may, for example, be performed using computer instructions that are stored on one or more memory devices and are executed by one or more processing devices on the mobile device.

Figure 4:
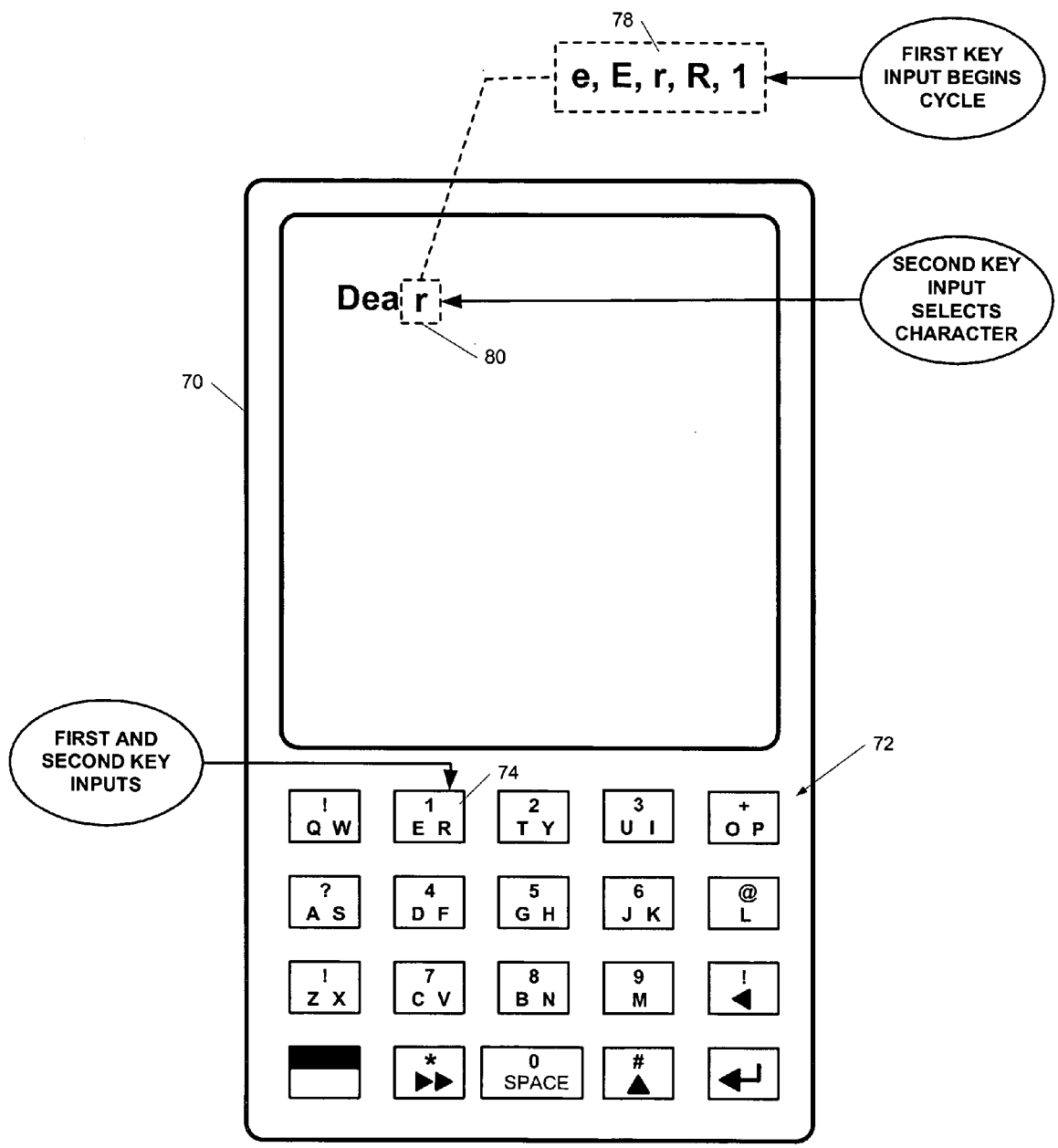
FIG. 4 depicts a example mobile device having a keyboard with a plurality of multi-character keys.

FIG. 4 depicts an example mobile device 70 having a keyboard 72 with a plurality of multi-character keys. In this example 70, the keyboard 72 provides a reduced QWERTY-style keyboard. That is, the letter characters are associated with the keys in the pattern of a standard QWERTY-style keyboard, with one or two letter characters being associated with each multi-character key. As illustrated, the multi-character keys may also have associated number characters, functions (e.g., space, carriage return, backspace, etc.), and/or alternate characters (e.g., !, +, @, #, etc.). In addition, the multi-character keys may also have associated characters that are not printed on the key, for example lower-case characters.

In operation, pressing one of the multi-character keys 74 generates a first input, which causes the mobile device to sequentially display characters 78 associated with the key 74. In the illustrated example, the characters are sequentially displayed in a region on the display where the selected character will appear, shown by the dotted box 80. The multi-character key 74 is then pressed again to generate a second input to select the displayed character 80.

In the illustrated example, a user desires to input the lower-case letter character "r." The user thus presses the multi-character key 74 associated with the character "r," causing the device 70 to begin cycling through the characters (e, E, r, R, 1) 78 associated with the pressed key 74 on the display. When the desired character "r" appears on the display, the user uses the multi-character key 74 to generate a second input to select the displayed character 80. As described above, the second input to select the displayed character may, for example, be generated by pressing the multi-character key 74 a second time, further depressing the multi-character key 74 to activate a second switch, or releasing the multi-character key 74.

Figure 5:
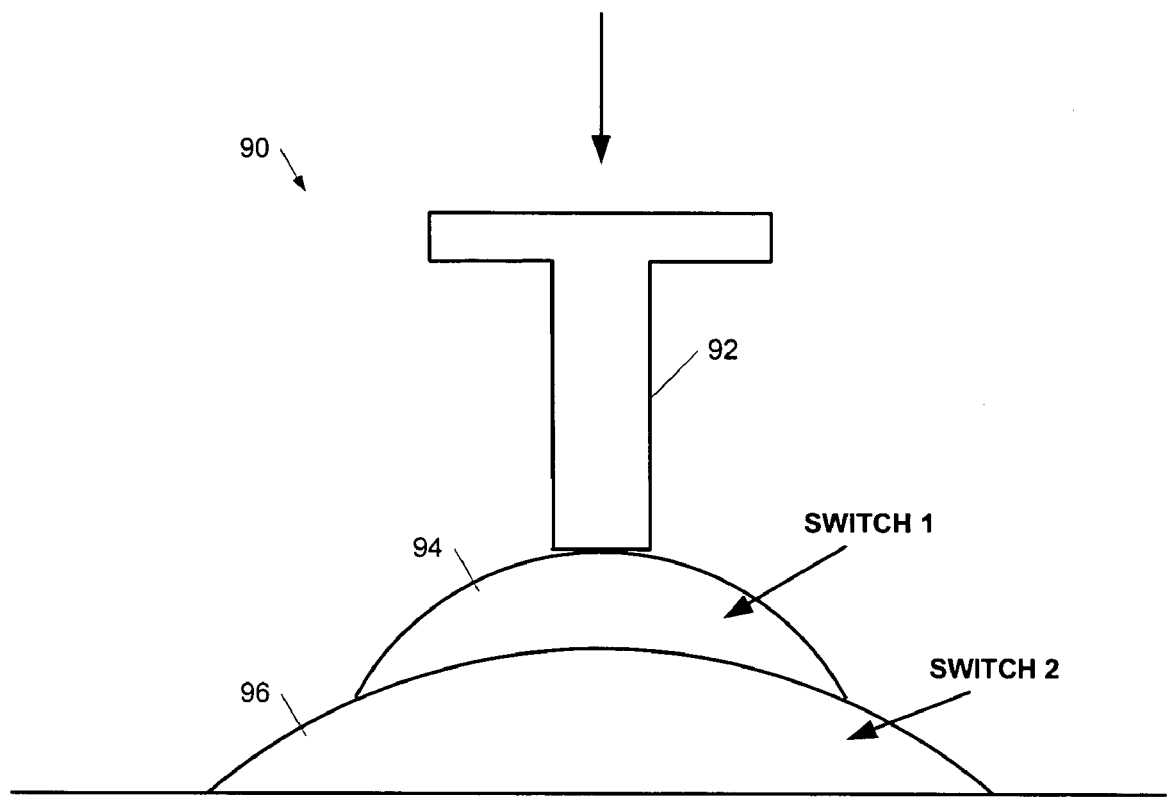
FIGS. 5 and 6 depict two examples of multi-character keys having two key switches for selecting characters.
Figure 6:
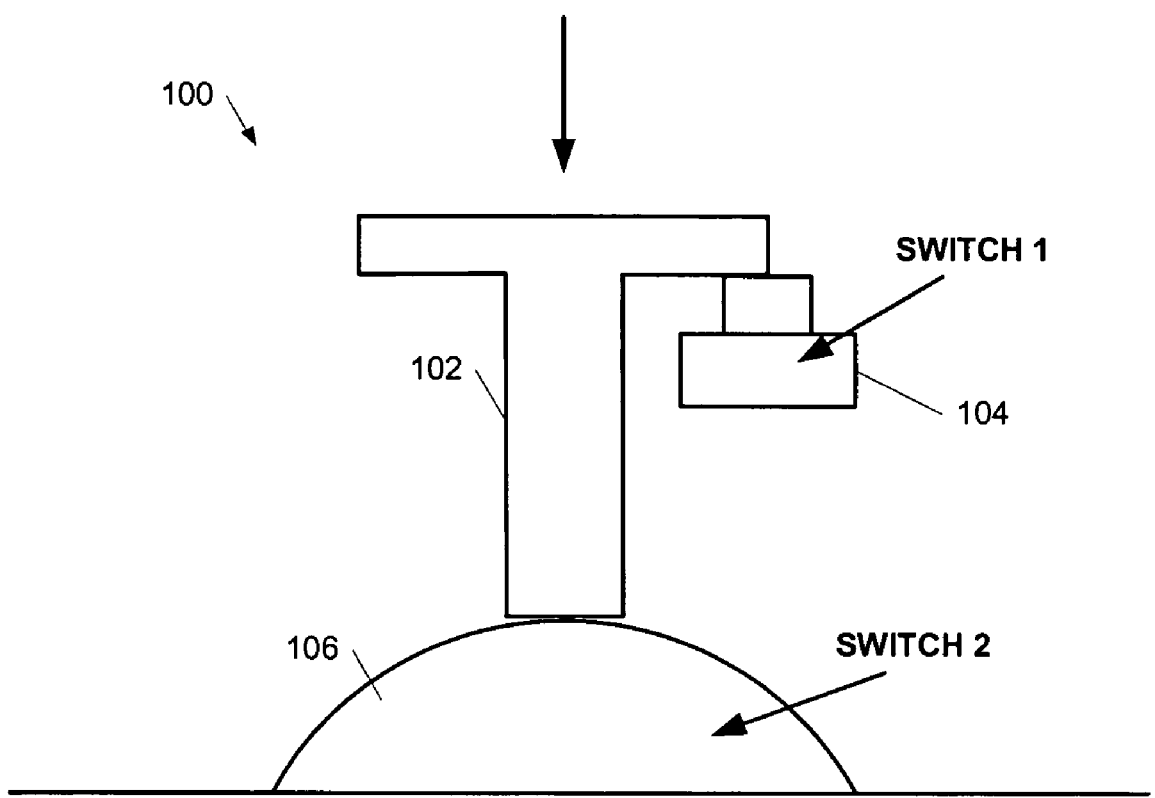

FIGS. 5 and 6 depict two examples of multi-character keys having two key switches for selecting characters. In FIG. 5, the multi-character key 90 includes a key portion 92 and two dome switches 94, 96. Partially depressing the key 92 activates the first dome switch 94, and completely depressing the key 92 activates the second dome switch 96. Similarly, the multi-character key 100 depicted in FIG. 6 includes a key portion 102 and two switches 104, 106. In this example 100, the first switch is activated by a top portion of the key 100 when the key 100 is partially depressed, and the second switch 106 is activated by completely depressing the key 102. In both examples 90, 100, pressing the key 92, 102 to activate the first switch 94, 104 may cause the mobile device to sequentially display characters associated with the key 92, 104, and pressing the key 92, 102 to activate the second switch may cause the mobile device to select a currently displayed character.

It should be understood that other key switches could be used with a multi-character switch instead of the examples key switches shown in FIGS. 5 and 6. For example, a single key switch having two positions may be used instead of the dual key switch solutions shown in FIGS. 5 and 6. Other key switch designs are also possible.

Figure 7:
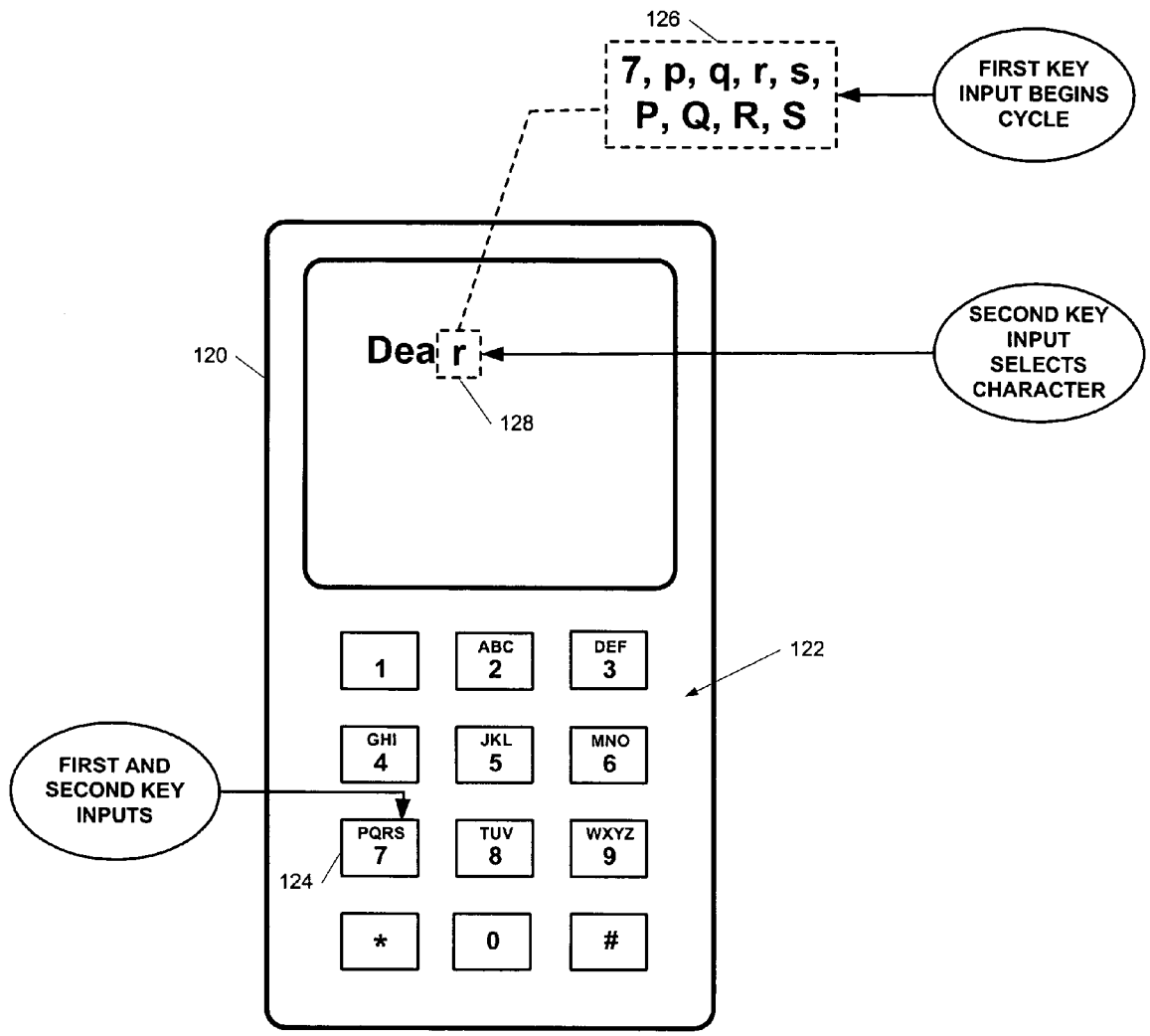
FIG. 7 depicts another example mobile device having a keyboard with a plurality of multi-character keys.

FIG. 7 depicts another example mobile device 120 having a keyboard 122 with a plurality of multi-character keys. In this example 120, the keyboard is a traditional telephony-style keypad. Pressing one of the multi-character keys 124 generates a first input, which causes the mobile device to sequentially display characters 126 associated with the key 124. The multi-character key 124 is then used to generate a second input to select the displayed character 128. The second input may, for example, be generated by pressing the multi-character key 124 a second time, further depressing the multi-character key 124 to activate a second switch, or releasing the multi-character key 124.

Figure 8:
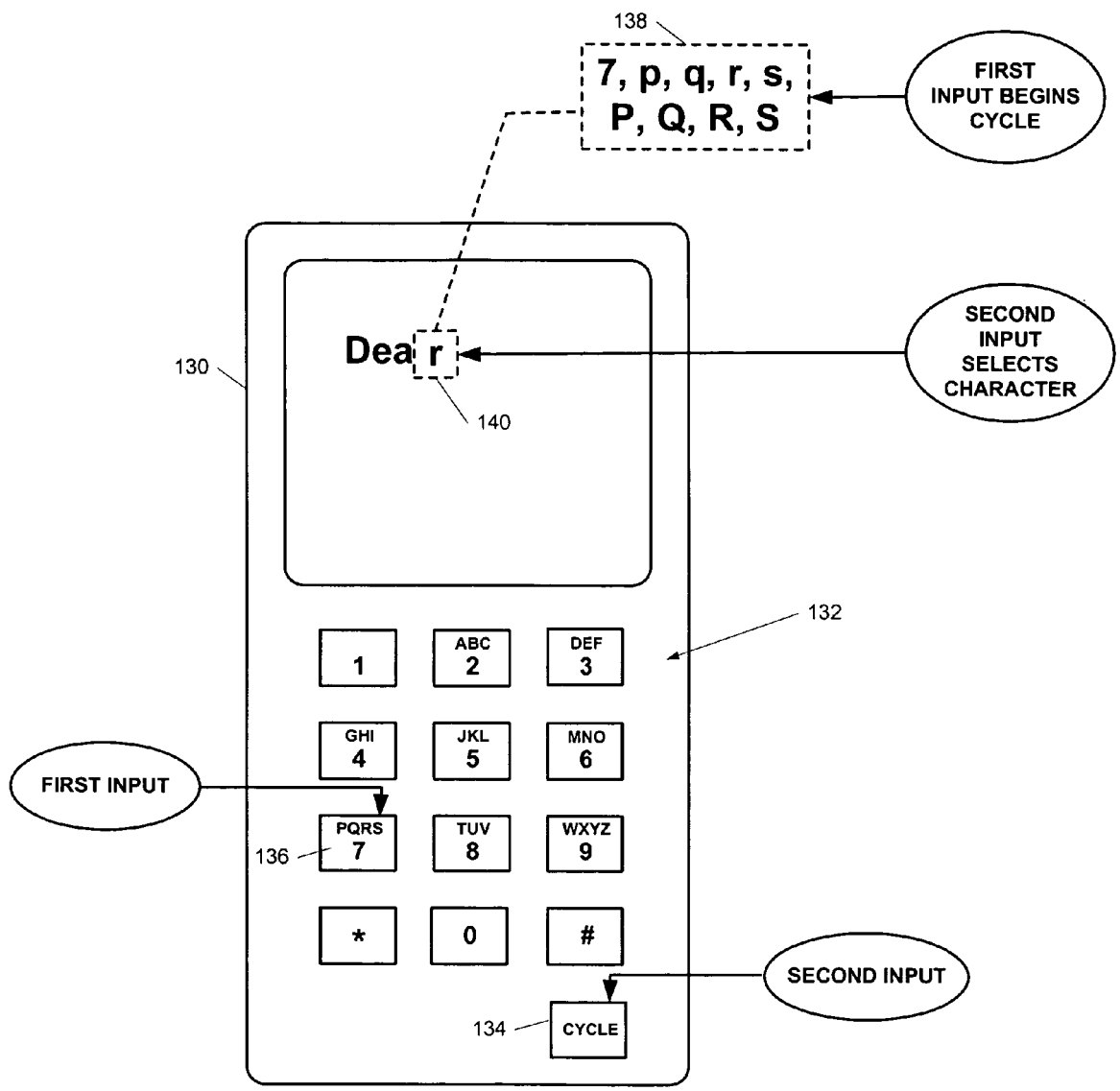
FIG. 8 depicts an example mobile device having a telephony-style keyboard with a plurality of multi-character keys and a specialized cycle key.

FIG. 8 depicts an example mobile device 130 having a telephony-style keyboard 132 with a plurality of multi-character keys and a specialized cycle key 134. Pressing one of the multi-character keys 136 generates a first input, which causes the mobile device to sequentially display characters 138 associated with the key 136. The specialized key 134 is then used to generate a second input to select the displayed character 140.

Figure 9:
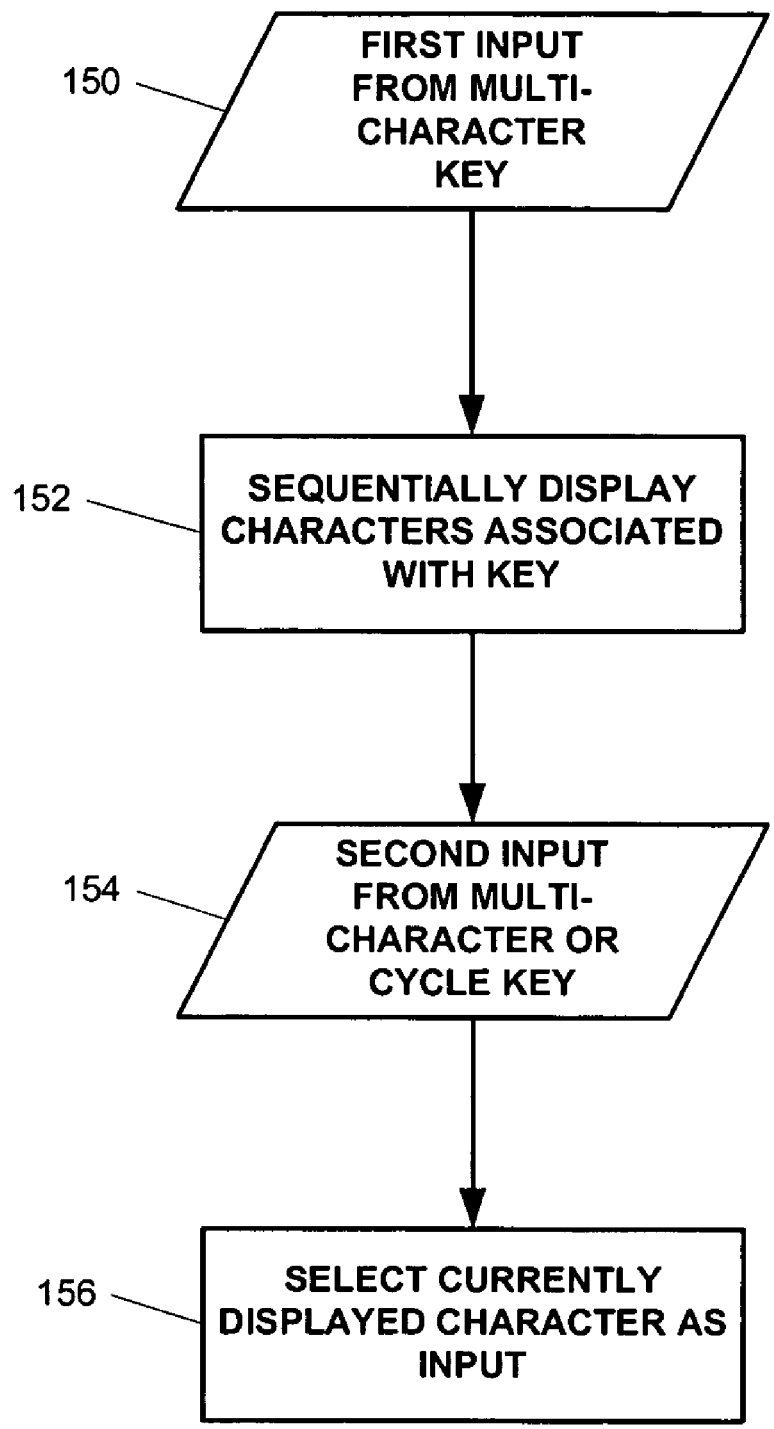
FIG. 9 is a flow diagram depicting an example method for inputting data using multi-character keys.

FIG. 9 is a flow diagram depicting an example method for inputting data using multi-character keys. In step 150, a first input is generated using a multi-character key. The first input causes characters associated with the multi-character key to be sequentially displayed in step 152. When the desired character is displayed, a second input is generated at step 154, which selects the last displayed character as the data input in step 156. The second input may be generated using the multi-character key or using another key, such as a specialized cycle key.

Figure 10:
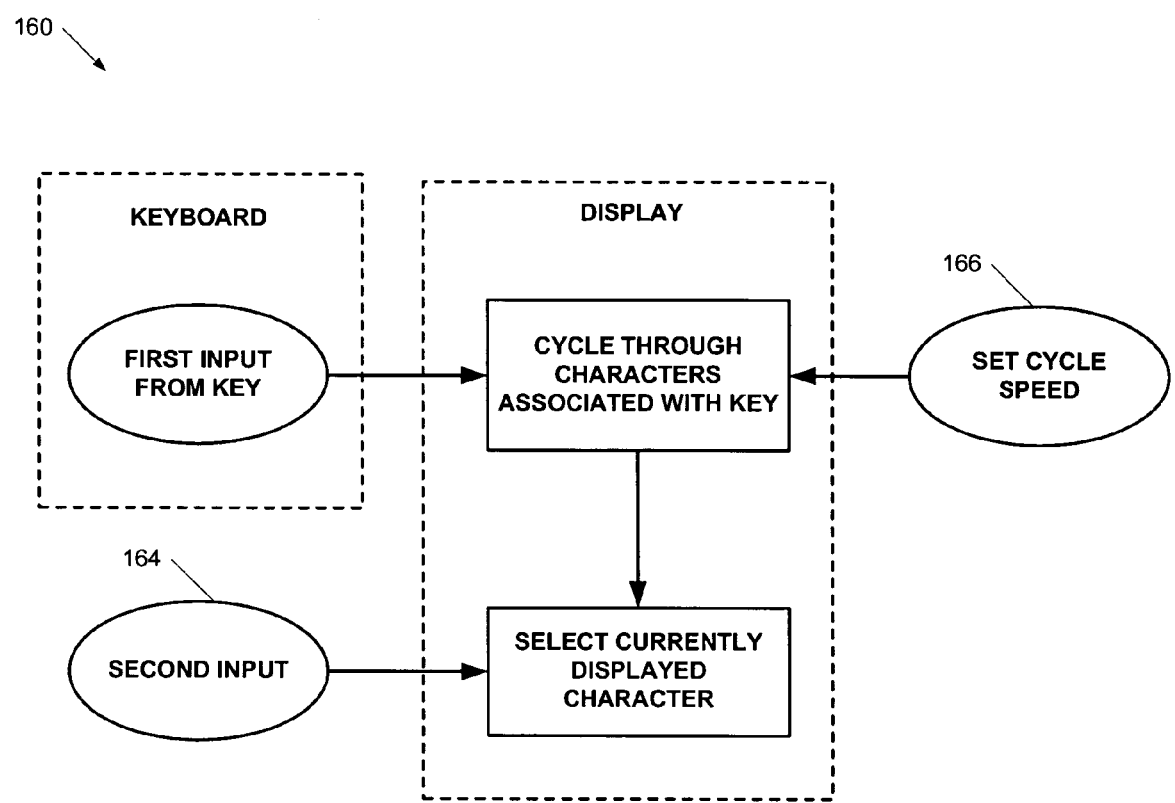
FIG. 10 is a block diagram of another example system for inputting data to a mobile device that includes a keyboard having a plurality of multi-character keys.

FIG. 10 is a block diagram of another example system 160 for inputting data to a mobile device that includes a keyboard 162 having a plurality of multi-character keys. This example illustrates that the second input 164 that is used to select the currently displayed character may be received from an input device other than the keyboard 162. For example, the second input 164 may be received from an auxiliary input device, such as a thumbwheel, a mouse, a touchpad, or the like.

The example of FIG. 10 also illustrates that an additional input 166 may be received to control the rate at which the characters associated with the multi-character key are sequentially displayed. The cycle rate input 166 may be in the form of a display rate, for example identifying a number of characters to display in a set amount of time (e.g., 1 character per second). In another example, the cycle rate input 166 may directly control the cycling of characters. For instance, the input 166 may be generated using a thumbwheel such that a different character in the sequence is displayed each time the thumbwheel is rotated.

Figure 11:
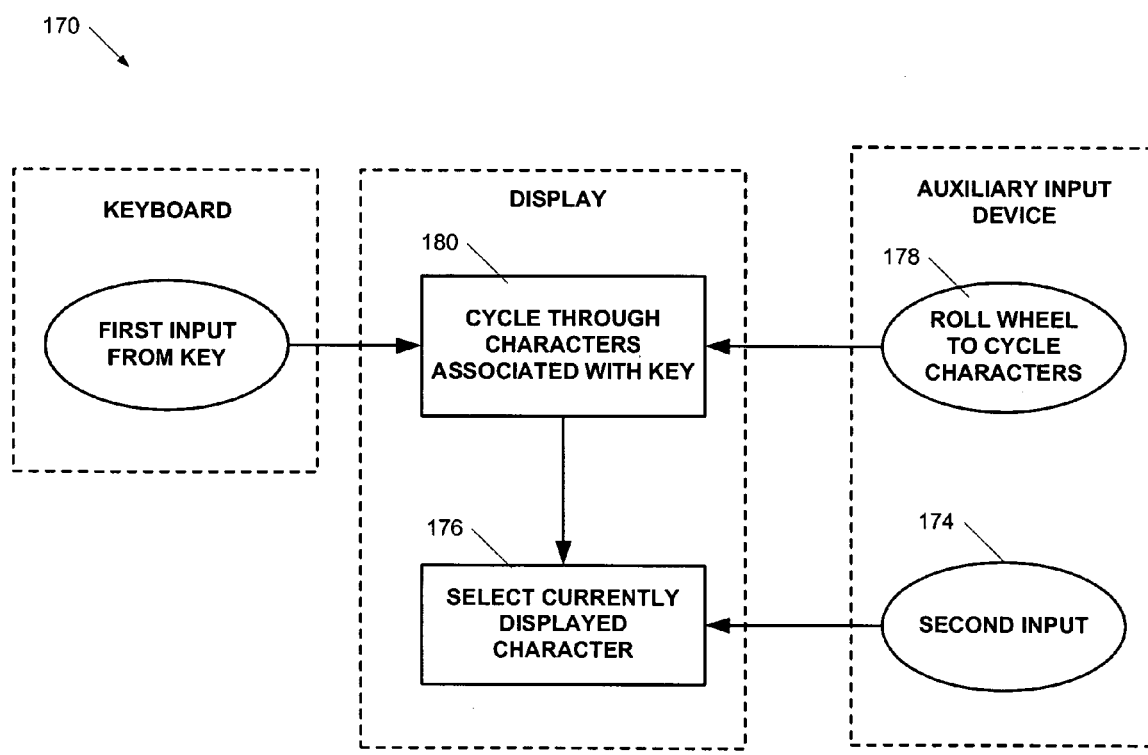
FIG. 11 is a block diagram of an example system that includes an auxiliary input device.

FIG. 11 is a block diagram of an example system 170 that includes an auxiliary input device 172. The auxiliary input device 172 may, for example, include a thumbwheel, a mouse, a touchpad, a rocker switch, or the like. As illustrated, the auxiliary input device may be used to generate the second input 174 that is used to select the currently displayed character 176. The auxiliary input device 172 may also be used to generate a cycle rate input 178 to control the rate at which the characters associated with a multi-character key are sequentially displayed 180.

Figure 12:
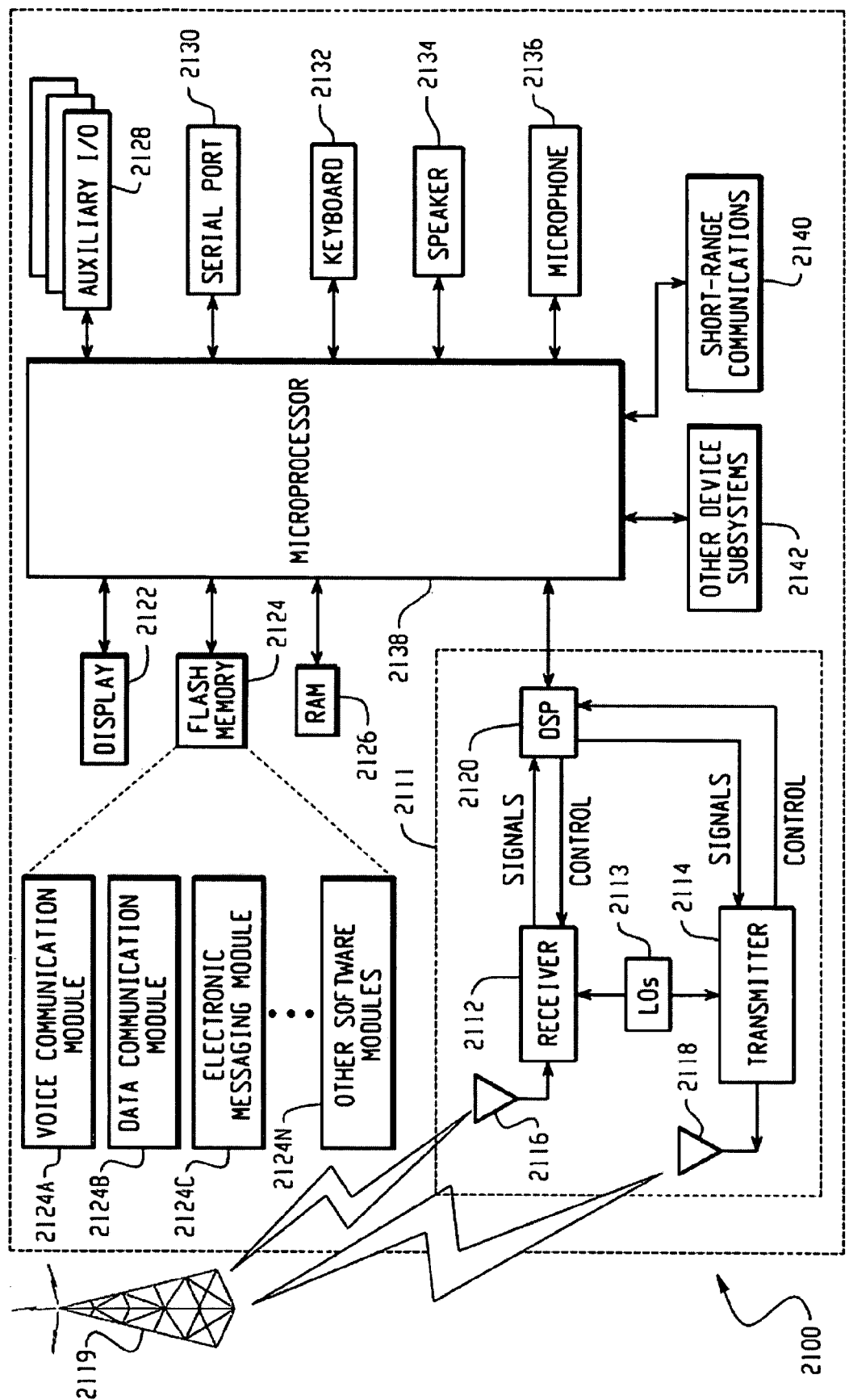
FIG. 12 is a block diagram illustrating an example mobile device which may include a system for inputting data using multi-character keys.

FIG. 12 is a block diagram illustrating an example mobile device 2100, which may include a system for inputting data using multi-character keys as described herein. The mobile device 2100 includes a processing subsystem 2138, a communications subsystem 2111, a short-range communications subsystem 2140, a memory subsystem 2124, 2126, and various other device subsystems and/or software modules 2142. The mobile device 2100 also includes a user interface, which may include a display 2122, a serial port 2130, a keyboard (including multi-character keys) 2132, a speaker 2134, a microphone 2136, one or more auxiliary input/output devices 2128, and/or other user interface devices.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art.

The invention claimed is:

1. A method for inputting character data to a mobile device that includes a keyboard having a plurality of multi-character keys, comprising:
    receiving a first input from the keyboard, the first input being generated by pressing and releasing one of the multi-character keys;
    in response to receiving the first input, sequentially displaying a plurality of characters associated with the pressed multi-character key, one character at a time and in at least an alphabetic sequence including capital and lower case characters;
    receiving a second input, the second input being generated by pressing one of the multi-character keys; and
    in response to receiving the second input, selecting a currently displayed one of the plurality of characters as the character data input to the mobile device.

2. The method of claim 1, wherein the second input is generated by pressing the one multi-character key that was pressed to generate the first input.

3. The method of claim 1, wherein the second input is generated by pressing a dedicated second input key on the mobile device.

4. The method of claim 1, wherein the first input is generated by pressing the one multi-character key to activate a first switch and the second input is generated by pressing the one multi-character key to active a second switch.

5. The method of claim 4, wherein the first switch is activated by partially depressing the one multi-character key and the second switch is activated by completely depressing the one multi-character key.

6. A mobile device, comprising:
    a keyboard that includes a plurality of multi-character keys;
    a display; and
    computer instructions stored on one or more memory devices and executable by one or more processing devices in the mobile device, when executed the computer instructions being operable to:
        receive a first input from the keyboard, the first input being generated by pressing and releasing one of the multi-character keys;
        in response to receiving the first input, causing the display to sequentially display a plurality of characters associated with the pressed multi-character key, one character at a time and in at least an alphabetic sequence including capital and lower case characters;

receiving a second input, the second input being generated by pressing one of the multi-character keys; and in response to receiving the second input, selecting a currently displayed one of the plurality of characters as a character data input.

7. The mobile device of claim 6, wherein the second input is generated by pressing the one multi-character key that was pressed to generate the first input.

8. The mobile device of claim 6, wherein the keyboard includes a dedicated second input key and the second input is generated by pressing the dedicated second input key.

9. The mobile device of claim 6, wherein each multi-character key includes a first switch and a second switch, and wherein the first input is generated by pressing the one multi-character key to activate the first switch and the second input is generated by pressing the one multi-character key to active the second switch.

10. The mobile device of claim 9, wherein the first switch is activated by partially depressing the one multi-character key and the second switch is activated by completely depressing the one multi-character key.

11. The mobile device of claim 6, wherein each multi-character key includes a two position switch, and wherein the first input is generated by pressing the switch to a first position and the second input is generated by pressing the switch to a second position.

12. The mobile device of claim 6, wherein the keyboard is a telephony-style keypad.

13. The mobile device of claim 6, wherein the keyboard is a reduced QWERTY-style keyboard.

14. The mobile device of claim 6, further comprising an auxiliary input device.

15. The mobile device of claim 14, wherein the second input is received from the auxiliary input device.

16. The mobile device of claim 14, wherein the auxiliary input device includes a thumbwheel, and wherein the thumbwheel is rotatably operable to generate a cycle signal that is used by the computer instructions to control a rate at which the plurality of characters are sequentially displayed, and each rotation of the thumbwheel displays a different character from the plurality of characters.

17. The mobile device of claim 6, wherein the computer instructions are further operable to receive a cycle speed input from a thumbwheel that is used to control a rate at which the plurality of characters are sequentially displayed.

18. A mobile device, comprising:

means for generating a first input, wherein the generation of the first input occurs upon a release of a multi-character key;

means for sequentially displaying a plurality of characters associated with the multi-character key, one character at a time and in at least an alphabetic sequence including capital and lower case characters, in response to the first input;

means for generating a second input upon depression of a multi-character key; and means for selecting a currently displayed one of the plurality of characters as a character data input in response to the second input.

* * * * *